United States Patent
Wrestler et al.

[15] 3,703,802
[45] Nov. 28, 1972

[54] COMBINE APPARATUS

[72] Inventors: Frank Wrestler, R.R. No. 1; Harry J. Swift, R.R. No. 4; Edgar R. Wrestler, R.R. No. 1, all of Hartford City, Ind. 47348

[22] Filed: Jan. 20, 1972

[21] Appl. No.: 219,321

[52] U.S. Cl. ............ 56/13.3, 56/14.6, 130/27 T, 130/27 R, 130/23, 209/291
[51] Int. Cl. .................................................. A01f 12/44
[58] Field of Search ........ 56/13.3, 14.6; 130/23, 27 R, 130/27 T; 209/290, 291, 289

[56] References Cited

UNITED STATES PATENTS

| | | | |
|---|---|---|---|
| 752,182 | 2/1904 | Ross et al. | 130/27 T |
| 961,775 | 6/1910 | Herr | 130/23 |
| 1,931,074 | 10/1933 | Johnson | 209/291 |
| 2,601,924 | 7/1952 | Gonder | 209/291 |
| 3,623,302 | 11/1971 | Schmitt | 56/14.6 |

Primary Examiner—Antonio F. Guida
Attorney—Harold B. Hood et al.

[57] ABSTRACT

The invention is a combine apparatus for harvesting field crops comprising in combination a vehicular supporting frame, means mounted on the frame for severing and disjoining the stalk and fruit portions of a field crop and producing a discharge thereof. Rotatably mounted on the supporting frame are a plurality of concentrically disposed, hollow cylindrical drums having foraminous walls which define a plurality of chambers. The innermost chamber is positioned to receive the discharge from the threshing means and the openings in the foraminous walls are graduated to pass the fruit portions, grain portions, and refuse material of the crop, respectively, and to retain the stem, tailings, and grain portions of the crop, respectively. Within each of the chambers there are provided auger means for forcibly moving the grain axially therethrough.

15 Claims, 10 Drawing Figures

PATENTED NOV 28 1972 3,703,802

COMBINE APPARATUS

BACKGROUND OF THE INVENTION

1. Field of the Invention

The present invention relates to combines for harvesting field crops and more particularly to an apparatus for use in combination with a threshing device, the apparatus being provided with a plurality of concentrically disposed, cylindrical drums having foraminous walls with graduated openings to separate the various portions of the crop as it is removed from a field.

2. Description of the Prior Art

The combine, used for harvesting field crops such as wheat, oats, corn, soybeans, and the like, is well known and widely used. Such combines, which typically incorporate a multiplicity of conveyors, blowers, and reciprocating straw walkers to separate the grain from the stalk and tailings portions of a crop, are highly complex mechanisms which cost substantial sums of money. Such combines, despite their sophisticated mechanisms, do not effect complete and total separation of the grain from the stalk and tailings portions of the crop. As a consequence, a portion of the grain remains with and is lost with the stem and tailings portions of the crop when these are ejected from the combine and the harvested grain contains therein an undesirable quantity of tailings which must be removed from the grain by subsequent cleaning operations in a separate mechanism.

SUMMARY OF THE INVENTION

The invention in its broader aspects is a combine for harvesting field crops which includes in combination a vehicular supporting frame, threshing means mounted on the frame for severing and disjoining the stem and fruit bearing portions of a crop to produce a discharge thereof. A plurality of concentrically disposed, hollow cylindrical drums are rotatably mounted upon the supporting frame in a position wherein the discharge is received within the innermost of the aforementioned drums. The drums are foraminous and have openings therethrough which are graduated to selectively pass the fruit, grain, and refuse material and to collectively retain the stems, tailings, and grain portions of the crop within respective ones of the chambers which are defined between the concentrically disposed drums.

Mounted within each of the drums is an auger means for forcibly moving the material therein in a predetermined direction. The apparatus may further be provided with a fan means for cleaning the grain retaining chamber.

In a specific embodiment the apparatus is provided with a pair of particle blowing devices for moving the clean grain to a storage bin on the combine apparatus and recirculating the tailings through the threshing means to remove any remaining quantity of grain therefrom.

In yet another specific embodiment of the invention, the foraminous walls of the cylindrical drums with the exception of the center drum are made with a plurality of removable panels whereby the panels can be simply and easily interchanged to adapt the combine apparatus for use in harvesting different types of crops such as wheat, corn, soybeans, etc., each of which requires differently sized and graduated holes.

By reason of the structure of the combine apparatus of the present invention, the effective area of the apparatus for separating the various portions of the crop is substantially increased. Because of the radial movement of the crop and crop portions through the apparatus, substantially less of the grain is lost, and by reason of the multiplicity of cylindrical drums, the grain is received from the apparatus in an essentially clean, refuse free condition.

Further, the structure of the combine substantially simplifies the construction of the combine eliminating therefrom any need for the conveyors and reciprocating grain walkers used in the conventional combine apparatus. This simplification not only substantially reduces the cost of producing the combine apparatus but also renders repair thereof much simpler and less expensive.

In addition, radial movement of the grain and other crop portions through the apparatus in conjunction with the provision of the auger means in the various chambers virtually eliminates any possibility of clogging of the apparatus during operation.

It is therefore an object of the invention to provide an improved combine for harvesting field crops which effects more complete separation of the grain from the other portions of the crop.

It is another object of the invention to provide such an apparatus which utilizes a plurality of concentrically disposed, foraminous walled drums having therethrough graduated openings for selectively separating the different parts of the field crops subsequent to threshing thereof.

It is still another object of the invention to provide a combine apparatus which does not require the use of conveyors or straw walking mechanisms.

It is another object of the invention to provide a combine apparatus of a substantially simpler construction than prior art combines.

It is still another object of the invention to provide a combine apparatus which is more resistant to clogging.

It is another object of the invention to provide a combine apparatus in which the grain separation is performed radially.

It is still another object of the invention to provide a combine apparatus which harvests the grain in a condition substantially free of refuse material.

It is yet another object of the invention to provide a combine apparatus which is simple to repair.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
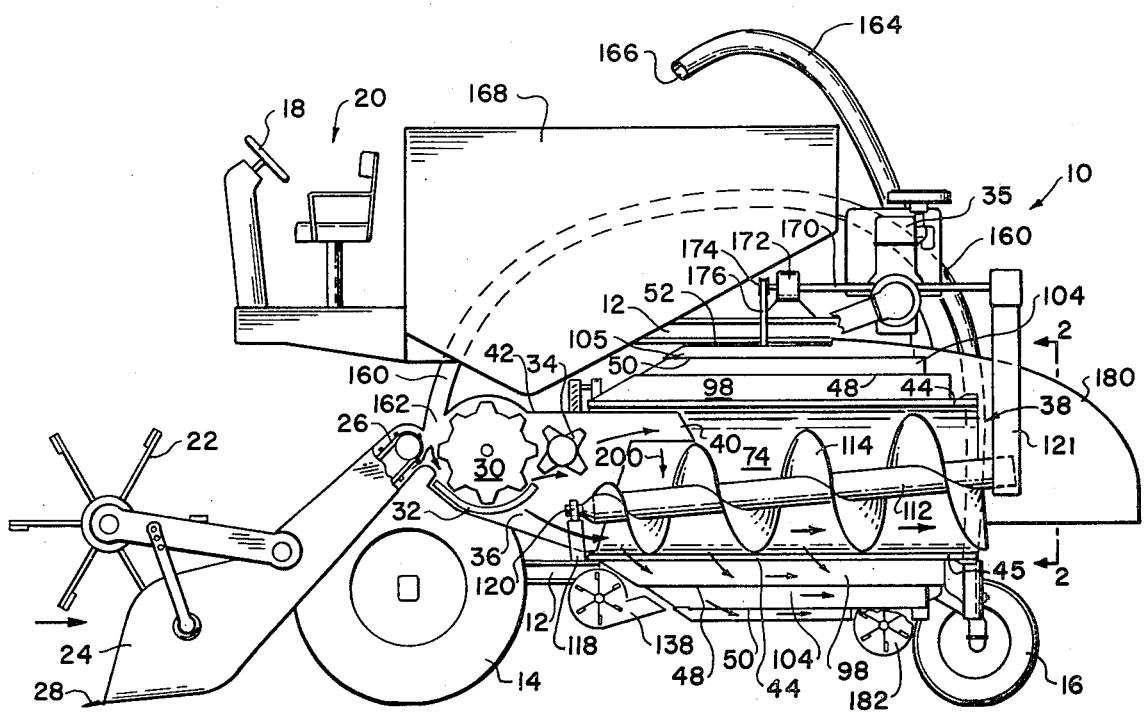
FIG. 1 is a diagrammatic longitudinal sectional view of a combine apparatus in accordance with the invention.

Referring now to the drawings there is illustrated in FIG. 1 a combine apparatus 10 which comprises a supporting frame 12 which is fitted with a pair of forwardly disposed drive wheels 14 and rear wheels 16 which are steerable by a conventional mechanism (not shown) which includes steering wheel 18 situated on an operating platform 20.

A conventional threshing means is mounted on the forward portion of frame 12 and includes a reel 22, crop hood or header 24, feed conveyor 26, a cutter 28, threshing cylinder 30, perforated threshing plate 32, and beater 34. There is also provided a suitable source of power for operating the apparatus such as an engine 35. In conventional manner, a crop is forced into header 24 by reel 22 and the crop bearing portions of a crop, which includes the tailings and grain portions thereof are severed by cutter 28 and moved upwardly to the threshing cylinder 30 by feed conveyor 26. As the crop moves between threshing cylinder 30 and threshing plate 32 the major portion of the grain is disjoined and removed from the crop and passes downwardly through threshing plate 32 as indicated by arrow 36. This portion of the grain passes rearwardly (to the right as viewed in FIG. 1) into a grain separating means 38. The remaining portion of the crop is passed against and by the beater 34 to further disjoin the grain from the crop. This disjoined portion of the crop forms a discharge which includes the stems, tailings (such as pods, leaves, etc.) and grain which is forcibly driven against end plate 40 of thresher hood 42. The operation of this portion of the combine apparatus is conventional and well known to those skilled in the art, and further description is unnecessary.

Figure 4:
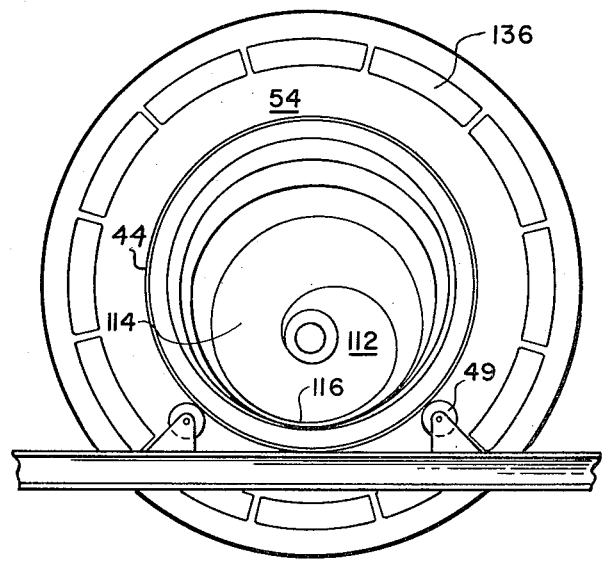
FIG. 4 is a front, end view of the concentrically disposed drums of the apparatus.

The separating means 38 includes a first cylindrical drum 44 which is rotatably supported at its rearward end 45 on supporting frame 12 by means of a plurality of rollers as at 46, 47 and 51, rollers 46, 47, and 51 bearing against the outer surface of cylindrical drum 44. The forward end of separating means 38 is supported on frame 12 by similar rollers as at 49 (FIG. 4 only).

Fixedly mounted to first drum 44 for rotation therewith are second, third, and fourth coaxial cylindrical drums 48, 50, and 52. Drums 48, 50, and 52 are secured in position by means of a frusto-conical end wall 54 and a plurality of spider elements as at 56, 58, and 60, respectively (FIGS. 3, 5, 6 and 7).

In one embodiment of the invention (shown in FIGS. 3 and 5), first drum 44 comprises a multiplicity of longitudinally extending angle irons 62 which are supported at one end by cylindrical neck portion 64 of end wall 54 and to the inside of an annular collar 66 with suitable spacers 67 therebetween as by welding. The circumferentially extending legs 68 of angle irons 62 define therebetween a multiplicity of longitudinally extending openings 70 while the radially extending legs 72 of angle irons 62 function, as will be explained below, as agitator vanes. It can thus be seen that angle irons 62 form a foraminous wall which defines a first cylindrical chamber 74.

Second drum 48 includes a relatively short, imperforate cylindrical wall portion 76 which is welded to end wall 54 as at 78, and a foraminous, cylindrical wall portion 80, both wall portions 76 and 80 being disposed concentrically with respect to first drum 44.

Figure 6:
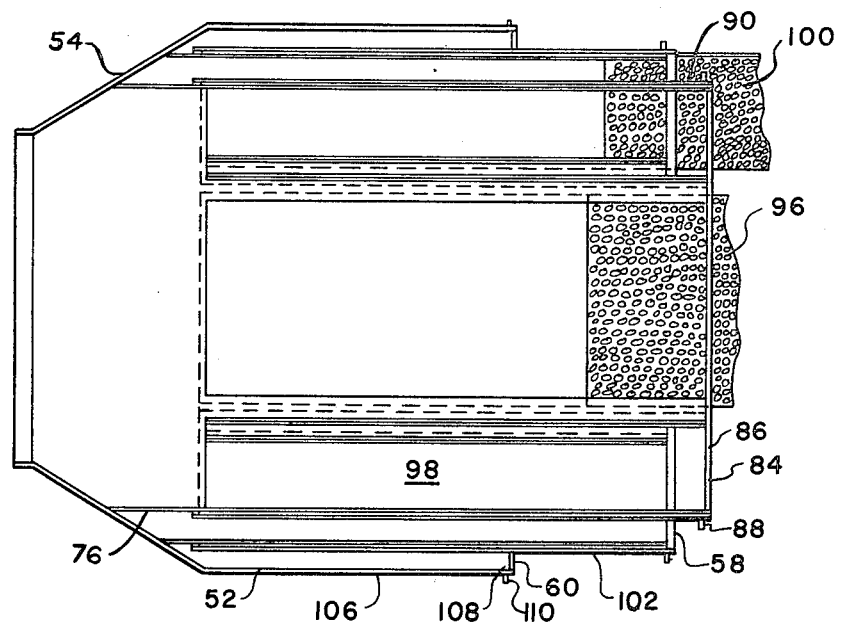
FIG. 6 is a fragmentary, side plan view of the concentrically disposed drum portions of the apparatus showing the removable, foraminous wall panels partially inserted.
Figure 7:
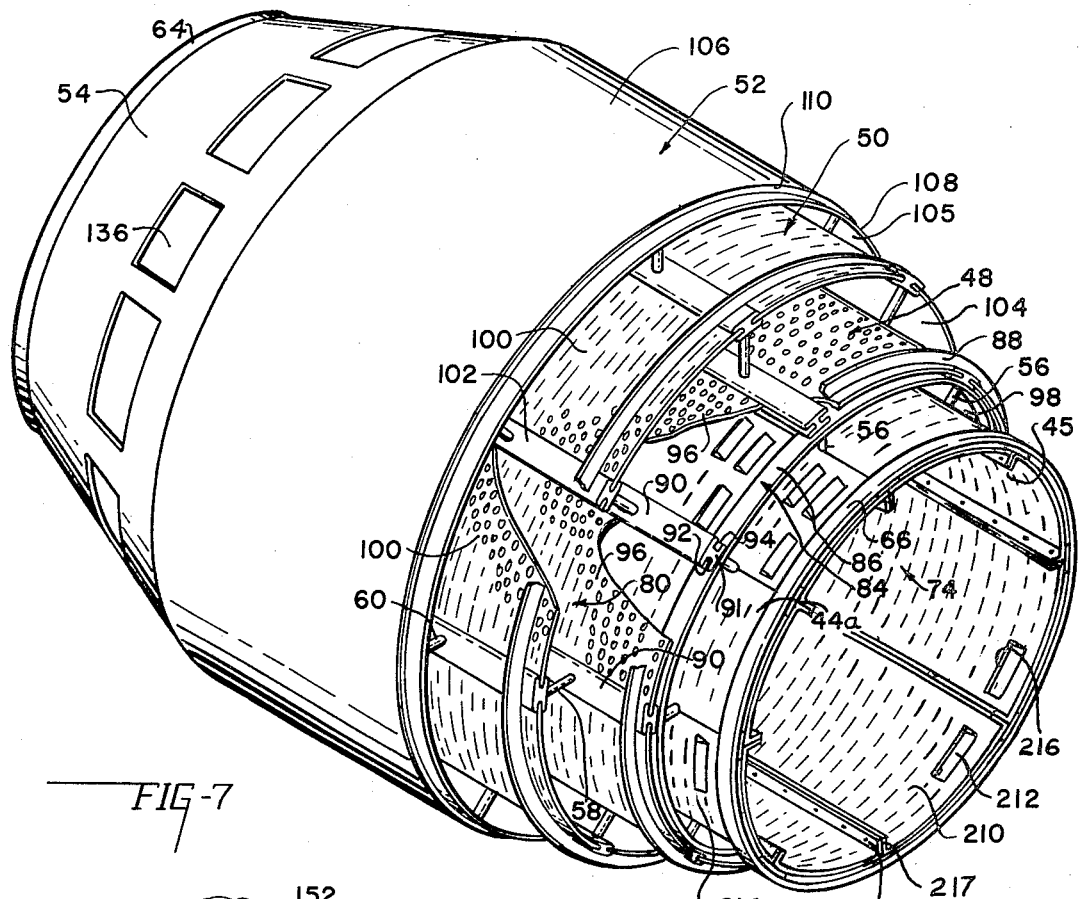
FIG. 7 is a fragmentary, perspective view of the drum portions of the invention.

As can best be seen in FIGS. 6 and 7, cylindrical drum 48 includes a frame 84 comprising a pair of annular collars 86, 88 and a plurality of longitudinally extending circumferentially spaced frame members 90. Each member 90 is provided with a pair of longitudinally extending slots 92, 94 disposed on circumferentially opposite sides thereof. The rearward ends 91 of members 90 are sandwiched between collars 86, 88 and secured as be welding. The forward ends of frame members 90 are welded to wall section 76 of end wall 54. Ends 91 and collars 86, 88 are supported by the radial supports on spider elements 56. A plurality of part cylindrical foraminous panels 96, eight in number, are slidably received in slots 92, 94 of each circumferentially adjacent pair of frame members 90 as shown. Frame 84 and panels 96 define an annular chamber 98 between the wall thereof and the first cylindrical drum 44.

Third cylindrical drum 50 is constructed in a manner identical to cylindrical drum 48 and includes a plurality of foraminous wall panels 100 which are again slidably received within a supporting frame 102, third cylindrical drum 50 defining a second annular chamber 104.

Fourth cylindrical drum 52 is made of imperforate material such as sheet steel and includes a cylindrical wall portion 106 (FIGS. 3 and 7) which is fixedly welded to end wall 54 at one end thereof and has its opposite end 108 supported by an annular collar 110 which is in turn supported by spider elements 60 which are welded between end 108 and third drum frame 102. Drum 52 defines a third annular chamber 105.

Figure 2:
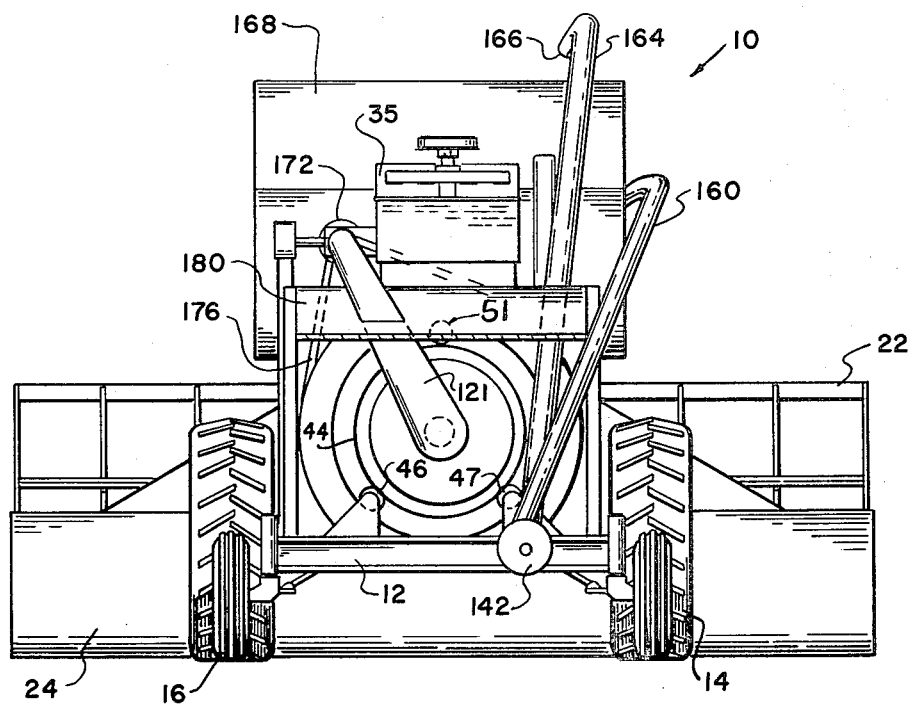
FIG. 2 is a plan view of the combine apparatus as viewed from the right in FIG. 1.
Figure 3:
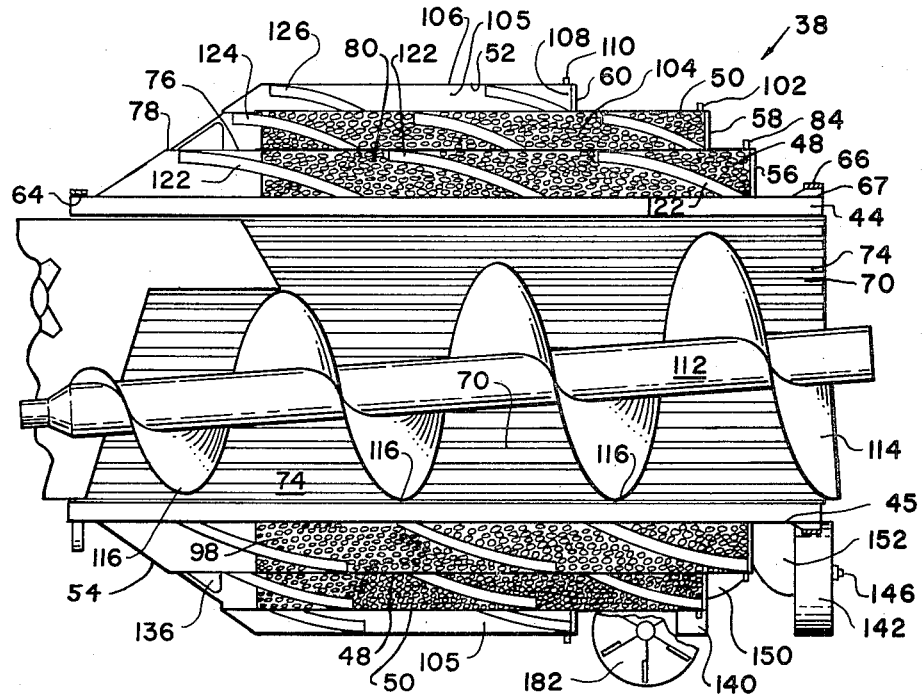
FIG. 3 is a fragmentary axial sectional view of the concentrically disposed drums of the combine apparatus.

A large, screw-like auger 112 is mounted in cylindrical chamber 74, auger 112 being provided with a helical vane 114 which has an increasing diameter from left to right as viewed in FIGS. 1 and 3. Auger 112 is positioned such that the outwardly disposed, perimetral portions 116 thereof (FIGS. 3 and 5) are disposed closely adjacent to the inwardly extending legs 72 of angle irons 62 at the bottom of chamber 74. Auger 112 may be stationary, or, in the alternative, auger 112 may be rotatably mounted within cylindrical chamber 74 by means of a suitable brace 118 and bearing 120 adjacent the smaller diameter end thereof, and at the larger diameter end thereof with a suitable chain or belt drive mechanism 121 (FIGS. 1 and 2 only) whereby it may be drivingly rotated in a direction to cause movement of material within chamber 74 from left to right as viewed in FIGS. 1 and 3.

Each of cylindrical drums 48, 50 and 52 is also provided with suitable helical vanes or augers 122, 124, and 126, respectively, as shown. Each of the vanes is fixedly secured in place by welding same to the supporting frames 90, 102, and to wall 106, respectively. It will be apparent that as cylindrical drums 48, 50 and 52, are rotated, helical vanes 122, 124, and 126 will cause movement of material within annular chambers 98, 104, and 105. Assuming clockwise rotation of the separating means (as viewed from the left in FIGS. 1 and 3), this movement will be in a direction from left to right.

Arcuate end plates 130, 132, and 134 are fixedly mounted to the frame 12 with brackets (not shown) in a position to partially close the lower portions of the open ends of annular chambers 98, 104, and 105, respectively. A plurality of rectangular windows 136 (FIGS. 4 and 7) are provided in end wall 54 in registry with annular chamber 104. A suitable fan 138 (FIG. 1 only) is mounted to frame 12 in a position to direct a blast of air longitudinally through annular chamber 104 from left to right as viewed in FIG. 1.

Figure 8:
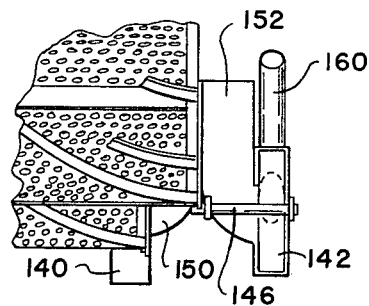
FIG. 8 is a fragmentary view showing details of the grain transporting means of the combine apparatus.

Adjacent the rear end of the separating means 38 are a pair of particle or grain blowers 140, 142, on vehicle frame 12 which, as can be seen in FIGS. 3 and 8, are provided with a common drive shaft 146 which is in turn driven by engine 35 by means of a convention chain, V-belt or the like drive (not shown).

Figure 5:
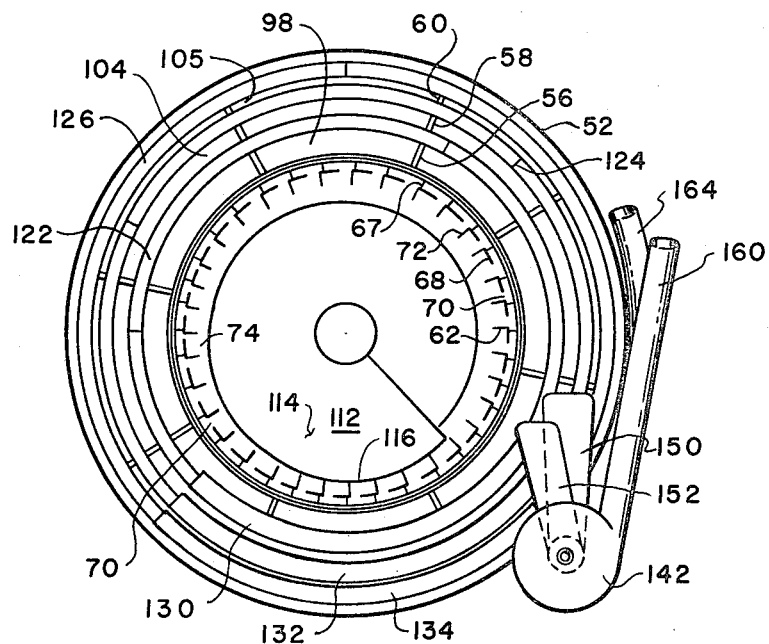
FIG. 5 is a rear, end view of the concentrically disposed drum portions of the apparatus.

A pair of grain chutes 150, 152 communicate between grain blowers 140, 142, respectively, and chambers 104, 98 at a point adjacent one end of arcuate end plates 132, 130, respectively, (FIG. 5). It should be noted that grain chutes 150, 152, are positioned adjacent the ends of arcuate plates 130, 132 which are disposed on the side of grain separating means 38 which is moving upwardly as it rotates (FIG. 5). Extending from grain blower 142 is a gently curved cylindrical recycling duct 160 which, as can best be seen in FIG. 1, has a discharge opening 162 adjacent the inlet side of threshing cylinder 30. Similarly, a cylindrical, gently curved grain transfer duct 164 extends from grain blower 140 and has a discharge opening 166 which discharges into grain bin 168.

To provide a means for rotating the concentrically mounted drums 44, 48, 50 and 52, engine 35 is provided with an auxiliary output shaft 170 to which is fitted a drive means 172 such as a gear box which includes an output sheave 174. An endless belt 176 or the like is trained about sheave 174 and fourth drum 52 thereby drivingly coupling same.

Fixedly mounted to frame 12 in conventional manner is a discharge hood 180 to prevent undesirable weather elements (wind and rain) from entering separating means 38. An air blast from fan 182 is partially ducted up through grain chute 150 for additional cleaning of grain. The remaining portion of this air blast is ducted up through chambers 104 and 98 to aid in the discharge of refuse from separating means 38.

In operation, the discharge emanating from the threshing cylinder 30 and beater 34 contains the disjoined stems, tailings and grain portions of the crop along with small particulate refuse material. This discharge is thrown and strikes the end plate 40 of the threshing hood 42, and is directed downwardly as indicated by arrow 200 into the forward portion of cylindrical chamber 74. It will be observed that the discharge is prevented from passing axially rearwardly through the chamber 74 by reason of the rear plate 40 and auger 112.

Simultaneously, the grain separating means 38 is rotating in a clockwise direction (as viewed from the front of the combine 10) thereby producing a relative movement between the auger 112 and first cylindrical drum 44. This relative movement causes the discharge material to move axially rearwardly through first chamber 74, and, simultaneously therewith, the movement of drums 44 and the action of the upstanding leg portions 72 of angle irons 68 causes the discharge to be substantially agitated and tumbled. As a result of this movement, the tailings, grain, and refuse material in the discharge is caused to pass radially outwardly through the openings 70 between angle irons 62 and into first annular chamber 98. Because the stems are too large to pass through the openings 70, they are retained within cylindrical chamber 74 and are ultimately discharged from the rear of the chamber. The tailings, grain, and refuse particles in annular chamber 98 are again agitated and tumbled by the movement of the foraminous wall 96 thereof and the helical vanes 122. The openings in the wall 96 are proportioned to permit the grain portion of the crop, along with the refuse material, to pass therethrough, but are too small to pass the pods, leaves, and other constituents of the tailings. Consequently, the tailings portion (which contains some grain residium) is retained in annular chamber 98 ultimately and passes axially rearwardly therethrough by reason of the action of helical vanes 122. As the tailings portion of the crop reaches the rear extremities of annular chamber 98, it is prevented from being directly discharged therefrom by arcuate end plate 130. However, as the tailings portion is carried upwardly along the upwardly moving wall of the drum 48 it is, by the action of the helical vanes 122, forced to discharge into chute 152. From this point, the tailings portion passes into the grain blower 142 from which it is forcibly ejected through duct 160 and back to the inlet side of the threshing cylinder 30. It will be observed that this portion of the threshed crop, because it does not contain either the stems or substantial amounts of the grain portion of the crop, will not substantially increase the quantity of the material being fed into the inlet of the threshing cylinder 30.

Because of the size of the openings in cylindrical drum 48, the grain and refuse material passes from chamber 98 therethrough and into the second annular chamber 104. Again, the grain and refuse material is tumbled and moved axially rearwardly, now by reason of helical vanes 124. This agitation and movement causes the refuse material mixed with the grain to pass through the third cylindrical drum 50 and into the third annular chamber 105. Simultaneously, the grain is prevented from passing through the wall of the third cylindrical drum 50, because the openings therethrough have a size smaller than the grain.

The grain is thus moved axially rearwardly by the action of vanes 124 until it encounters arcuate end plate 132. At this point, the grain moves upwardly along the upwardly moving side of third cylindrical drum 50, enters the grain chute 150, grain blower 140 and is forcibly passed upwardly into the grain bin 168 through duct 164.

Lastly, the refuse material which includes such materials as sand, weed seed, and the like, is retained within the third annular chamber 105 and is moved axially rearwardly therethrough by helical vanes 126. When the refuse material reaches the rear extremity of the annular chamber 105, it encounters arcuate end plate 134 at which point it is moved upwardly therealong and discharged into a suitable refuse receiving bin (not shown).

The cylindrical walls of the drums 44, 48, 50, and 52, provide a substantial surface area for effecting separation of the portions of the crop. It should be noted that the speed of rotation of the drums 44, 48, 50, and 52 should be maintained below a speed at which the centrifugal force of the crop portions against the walls thereof would cause them to be retained thereagainst. Rather, with the speed of the drums maintained below this speed, it will be apparent that the portions of the crop will be substantially agitated and separated with maximum efficiency.

It will further be apparent that different types of crops will require that different size openings be provided in the foraminous walls of drums 48 and 50. However, because these walls are provided with removable panels 96 and 100, the panels can easily be interchanged with panels having different sized openings. Thus, the combine apparatus is seen to be readily adjusted or adapted for use with different types of crops without in any way affecting the efficiency thereof.

It will further be observed that the construction of the combine apparatus 10 in accordance with the present invention eliminates the use of conveyor belts, grain walkers, and other similarly complex and failure prone mechanisms. Instead, the entire separating operation is performed with simple components rotating as a unit.

Figure 10:
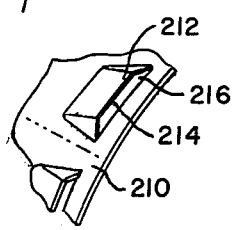
FIG. 10 is a fragmentary perspective view showing details of the openings in an alternative structure for the first cylindrical drum as viewed from the forward end of the combine apparatus.
Figure 9:
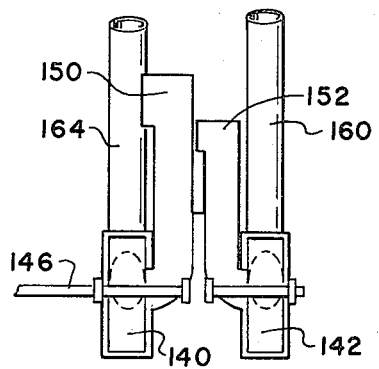
FIG. 9 is an axial, sectional view of the grain and tailings moving means.

An alternative structure for the first cylindrical drum 44a may also be used, this structure being shown in FIGS. 7 and 10. This structure comprises a plurality of longitudinally extending louvered panels 210 having the edges 217 thereof turned radially inwardly to form flanges 219 which are fastened together as by riveting to form foraminous walled cylindrical drum 44a. These panels are provided with a multiplicity of louvers 212. Each of the louvers 212 includes a protrusion 214 which is formed by conventional stamping techniques and an opening 216 which faces opposite the direction of flow of material through drum 44a to prevent their becoming clogged by the stalks and which is proportioned to pass the tailings, grain and refuse portions of the crop but to prevent passage therethrough of the stem or stalk portions thereof. As with foraminous panels 96 and 100, the foraminous walled cylindrical drum 44a can be interchanged as needed for use with different crops.

In a specific model of the invention, the openings in the first cylindrical drum 44 have a width of 0.625 inches, the perforations in panels 92 have a diameter of 0.375 inches, and the openings in foraminous panels 100 have a diameter of 0.125 inches, these are approximate dimensions having been selected for use in harvesting soybeans.

While there have been described above the principles of this invention in connection with specific apparatus, it is to be clearly understood that this description is made only by way of example and not as a limitation to the scope of the invention.

What is claimed is:

1. In a combine for harvesting field crops, the combination comprising:
   a. a vehicular supporting frame,
   b. threshing means mounted on said frame for severing and disjoining the stem and fruit bearing portions of a crop and produce a discharge thereof,
   c. a first foraminous, cylindrical wall defining a cylindrical chamber,
   d. second and third foraminous cylindrical walls secured to and disposed concentrically and radially outwardly of said first wall and said second wall, respectively, and defining therebetween first and second annular chambers,
   e. means for rotatably mounting said walls as a unit on said frame in a position with the axes thereof common and disposed generally horizontally and with said first chamber disposed in a position to receive said discharge,
   f. the openings in said first wall being proportioned to pass the fruit portions of a crop and prevent passage therethrough of the stem portion of said crop, the openings in said second wall being proportioned to pass the grain portion of said crop and prevent passage therethrough of the tailings portion of said crop, the openings in said third wall being proportioned to pass refuse matter having a size smaller than said grain portion and to prevent passage therethrough of said grain portion,
   g. auger means mounted within said cylindrical and said first and second annular chambers for forcibly moving said stem tailings, and grain portions therethrough in a predetermined direction, and
   h. means for rotating said first, second, and third walls as a unit about the axes thereof.

2. The combination of claim 1 wherein said second and third walls each include a wall frame and a plurality of foraminous panels removably mounted thereon.

3. The combination of claim 2 wherein said wall frames each include at least one annular collar and a plurality of elongated members secured thereto and extending parallel to the axis of said second wall, each said elongated member being provided with a pair of longitudinally extending slots, each said foraminous panel being arcuate and slidably received in a predetermined pair of said slots.

4. The combination of claim 1 wherein said first cylindrical wall is made from louvered sheet metal.

5. The combination of claim 1 wherein said first cylindrical wall comprises a supporting frame including at least one annular member disposed coaxially of the axis of said wall adjacent one end thereof, and a plurality of angle iron members extending parallel to the axis of said wall in circumferentially, spaced-apart relationship.

6. The combination of claim 1 wherein said auger means includes a first auger positioned within said first chamber, said auger including a central shaft and a helical blade fixedly mounted thereon.

7. The combination of claim 6 wherein said first auger is positioned with its central shaft extending adjacent and at an angle with respect to the axis of said first cylindrical wall, portions of the perimetral edge of said blade being disposed closely adjacent the bottom surface of said chamber.

8. The combination of claim 6 wherein said auger means further includes a second auger blade in said first annular chamber and a third auger blade in said second annular chamber.

9. The combination of claim 8 wherein said second and said third auger blades are helical elements fixedly mounted to the inside surface of said second and said third cylindrical walls, respectively.

10. The combination of claim 1 further comprising a fourth cylindrical wall, said fourth wall being imperforate and disposed concentrically and radially outwardly of said third wall, said third wall and said fourth wall defining a third annular chamber therebetween, said particulate matter being collected in said third annular chamber.

11. The combination of claim 10 wherein the end of said first annular chamber opposite said predetermined direction is closed.

12. The combination of claim 11 further comprising means adjacent the ends of said first, second, and third annular chambers, opposite said closed end of said first annular chamber to prevent discharge of said tailings, grain, and refuse matter, respectively, from the bottom portions of said chambers.

13. The combination of claim 12 wherein said discharge preventing means includes a plurality of arcuate plates fixedly secured to said supporting frame and closing the lower portions of said chambers.

14. The combination of claim 13 further comprising means for collecting and conveying said grain from said second chamber, and means for collecting said grain from said conveying means.

15. The combination of claim 14 wherein said collecting and conveying means includes a duct communicating with and extending downwardly from said second chamber from a point thereof adjacent one end of that one of said arcuate plates closing the end thereof, and a grain blower mounted on said duct to receive grain discharged thereinto, said retaining means including a bin.

* * * * *